United States Patent Office 3,491,025
Patented Jan. 20, 1970

3,491,025
MINERAL OIL SOLUTIONS OF ALKENYL SUBSTITUTED BIS-SUCCINIMIDE OF POLYALKYLENE POLYAMINO DIAMIDE FROM POLYALKYLENE AMINE-UREA CONDENSATION PRODUCT
Richard J. Lee, Park Forest, Ill., assignor to Standard Oil Company, Chicago, Ill., a corporation of Indiana
No Drawing. Original application Mar. 8, 1965, Ser. No. 438,103, now Patent No. 3,449,362, dated June 10, 1969. Divided and this application Jan. 22, 1968, Ser. No. 699,330
Int. Cl. C10m 1/32
U.S. Cl. 252—49.6    5 Claims

ABSTRACT OF THE DISCLOSURE

Solutions in mineral oil of lubricating oil class of succinimides of polyalkylene polyamine diamides derived from polyalkylene polyamine-urea condensation products and boric acid borated products of the succinimides provide high detergency-dispersancy lubricating compositions of ashless type that are effective against varnish and sludge deposition and/or formation. The polyalkylene polyamine-diamides are obtained by reacting a polyalkylene polyamine with urea in the mole ratio of two moles of polyamine per mole of urea, for example, according to the disclosure in U.S. Patent No. 2,644,759. The succinimide is obtained by the condensation of the polyalkylene polyamine diamide with an alkenyl substituted succinic anhydride whose alkenyl groups have molecular weights in the range of 400 to 100,000 in mole ratios of 0.4 to 0.7 mole of the diamide per mole of alkenyl substituted succinic anhydride. The boric acid borated succinimides can have 0.05 up to 1.5 gram atom of boron per gram atom of nitrogen.

This application is a division of my copending application Ser. No. 438,103, filed Mar. 8, 1965, that is directed to the above-mentioned solutes and their preparation. That parent application is now U.S. Patent 3,449,362 dated June 10, 1969. Those solutes together with certain specific classes of other lubricant addition agents comprise an essential combination of addition agents in lubricating oils disclosed in copending application Ser. No. 668,165. Also those solutes that are not borated are the essential anti-foulant addition agent for refinery processing hydrocarbon streams according to the method of my copending application Ser. No. 543,510. Those two copending applications are now, respectively, U.S. Patents 3,385,791 dated May 28, 1968, and 3,380,909 dated Apr. 30, 1968.

BACKGROUND OF THE INVENTION

During the latter 1940's, through 1950's and up to the early 1960's crankcase lubricating oils contained as their detergent or dispersant addition agents mainly alkaline earth metal salts of phenolic compounds, hydrocarbon sulfonic acids and/or hydrocarbon-$P_2S_5$ reaction products which are ash-forming type addition agents. Salts of relatively low molecular weight (less than 20 carbon atom content) hydrocarbon sulfonic acids and hydrocarbon-$P_2S_5$ reaction products had been proposed in the early 1940's as anti-rust addition agents for lubricants. Their ash-forming type salt counterparts used in lubricating oils for their detergency or dispersancy properties evolved from the discovery that larger hydrocarbon moieties imparted detergency and/or dispersancy to the anti-rust additives. Also in the 1940's short hydrocarbon chain substituted succinic acids and their salts, amides and imides were found to be useful anti-rust addition agents for lubricant oil based lubricants.

The combination of increased short-trip driving with high horsepower engine automobiles, extended oil drain recommendations (drain intervals in excess of 2000 miles) and the use of positive crankcase ventilation (PCV) devices to reduce hydrocarbon emissions suspected of contributing to urban smog problems placed further burdens on motor oil service performance. The PCV devices meter combustion chamber blowby (gases and vapors blowing by piston compression rings from combustion chambers to the crankcase) from the crankcase back into the combustion chambers with air-fuel mixtures. This caused acidic blowby to be trapped in the crankcase. The short-trip driving is the urban type short drive and park type driving that does not permit the crankcase oil to reach a temperature where fuel hydrocarbons and moisture can be driven from the lubricating oil. The increased short-trip driving and use of PCV devices increased the varnish and sludge deposition potential.

The ash-forming type dispersant and/or detergent addition agents by the end of the 1950's and early 1960's apparently had been improved to their limit for detergency and/or dispersancy properties and tended to be inadequate for the more severe anti-varnish and anti-sludge service known to be required of them. In the middle 1940's an oil-soluble ashless type dispersant and/or detergent derived from polyacrylates was proposed. Later other polymeric products having built-in polar groups that were non-ash forming were proposed for lubricating oil detergent-dispersant addition agents. Also amides from complex diamines and polymer di- and tri-acids as well as their boric acid borated products were proposed as ashless detergent-dispersant addition agents for lubricating oils.

Then, like the evolution of the lubricant anti-rust hydrocarbon sulfonates and hydrocarbon-$P_2S_5$ products addition agents to lubricating oil detergent-dispersant addition agents by the increase in size of their hydrocarbon moieties, the lubricant anti-rust amides and imides of alkyl substituted succinic acids evolved into detergent-dispersant addition agents for lubricating oils by increase in size of their hydrocarbon substituents on the succinic acid moiety. These longer hydrocarbon chain substituted succinic acid amides and imides were non-ash-forming as were their borated products. The amides and imides from ordinary amines and the long hydrocarbon chain substituted succinic acids and anhydrides were not effective detergent-dispersant addition agents for the severe anti-varnish and anti-sludge service. However, the amide and imide polar groups as well as secondary amino group polar groups present in the amides and imides and mixtures of amide and imides resulting from the condensation reactions of amines and polyalkylene polyamines with the longer hydrocarbon chain substituted succinic acids and anhydrides were not capable of meeting the more severe anti-varnish and anti-sludge service when used at moderately low concentrations. This was also true of the borated products of long hydrocarbon chain substituted succinic acid amides, imides and mixture of amides and imides from polyalkylene polyamines. They could meet the more severe anti-varnish and anti-sludge service at higher use concentrations but this higher use concentration level imposed problems of compatibility with anti-rust, anti-wear and anti-oxidation addition agents with which they had to be used.

The drawbacks of the crankcase lubricating oil compositions that contained amides and imides derived from polyalkylene polyamines and the long hydrocarbon chain substituted succinic acids and anhydrides and their borated products are overcome by the mineral oil solutions of this invention.

SUMMARY OF THE INVENTION

The novel mineral oil solutions of this invention comprise hydrocarbon mineral oil solvent and as solute therein from 0.1 to 50 weight percent of an alkenylsuccinimide derivative of the reaction between (a) an alkenyl hydrocarbon substituted succinic anhydride whose alkenyl substituent has from 30 to 200 carbon atoms and (b) a polyamino urea derived from reacting at a temperature in the range of 200° to 500° F. urea and a polyalkylene polyamine in a mole ratio of two moles of polyalkylene polyamine per mole of urea, wherein the reaction of (a) and (b) is conducted under conditions splitting out and removing by-product water with a mole ratio of in the range of 0.4 to 0.7 mole polyamino urea per mole of the alkenyl hydrocarbon substituted succinic anhydride; and the boric acid borated product of the alkenylsuccinimide derivative. The solutions containing 10 to 50 weight percent of said solutes are useful concentrates for the preparation of fully formulated lubricating oils. The solutions containing 0.1 to 10, preferably 1.0 to 5.0, percent by weight of those solutes are useful as crankcase lubricating oils.

The above polyamino urea reactant (b) is a polyalklene polyamine diamide as will be better understood from the illustrative formulae hereinafter provided.

Polyamino urea reactant

In U.S. Patent No. 2,644,759 there is described as useful in printing inks to disperse pigments condensation products of 1 to 4 moles polyamines per mole of urea formed at 80° to 180° C. I have found that the condensation of two moles of polyalkylene polyamine with one of urea form polyamino ureas useful in the preparation of the solutes before defined. The polyalkylene polyamines useful in the preparation of the solutes of this invention have the formula

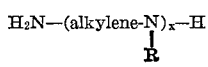

wherein $x$ is an integer of from 2 to about 10, R is hydrogen or a lower alkyl hydrocarbon substituent and "alkylene" is a lower alkylene, i.e. divalent, open chain, hydrocarbon group having from 1 to 8 carbon atoms. Individual polyalkylene polyamine compounds can be used or mixtures of various polyalkylene polyamines can be employed. Such polyalkylene polyamines include methylene amines, ethylene amines, propylene amines, butylene amines, pentylene amines, hexylene amines, heptylene amines, octylene amines, and other polymethylene amines which contain from 2 to 10 alkylene groups and 3 to 11 nitrogens. Specific examples of such polyalkylene amines include diethylene triamine, triethylene tetramine, tetraethylene pentamine, pentaethylene hexamine, heptaethylene octamine, dipropylene triamine, tripropylene tetramine, tetrapropylene pentamine, dibutylene triamine, tributylene tetramine, tributylene tetramine, tetrabutylene pentamine, dimethylene triamine, trimethylene tetramine, tetramethylene pentamine, pentamethylene hexamine, di(heptamethylene) triamine, di(trimethylene) triamine, decaethylene hendecamine, decamethylene hendecamine, $N_1,N_3$-dimethyl diethylene triamine, $N_1,N_5$-dimethyl tetraethylene pentamine, $N_1,N_5$-diethyl tetraethylene pentamine, dipentylene triamine, trihexylene tetramine, tetraheptylene pentamine, trioctylene tetramine, and tetrapentylene pentamine among others.

The foregoing polyalkylene polyamines where R is hydrogen are generally prepared by reacting an alkylene dihalide such as methylene dichloride, ethylene dichloride, propylene dichlorides, butylene dichlorides, propylene dichlorides, pentylene dichlorides, hexylene dichlorides, heptylene dichlorides and octylene dichlorides with ammonia. Where R is lower alkyl, i.e. methyl, ethyl, propyl and butyl, the alkylene dichloride-ammonia reaction product can be obtained by the use of the appropriate lower alkyl chloride.

The novel polyamino ureas useful in this invention are formed according to the following reaction equation where tetraethylene pentamine illustrative of the polyalkylene amine reactant and urea react in a 2:1 mole ratio.

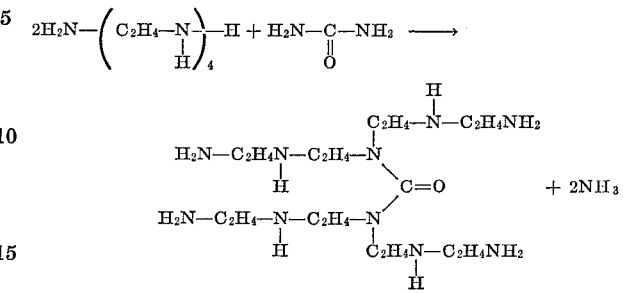

The resulting polyamino urea has the ten amino groups from the two moles of tetraethylene pentamine and the eight ethylene groups from the same source. There are also present in the polyamino urea product other polyamino ureas similar to that illustrated wherein the carbamide groups are from secondary amino nitrogens other than those shown and polyamino urea such as illustrated by the following:

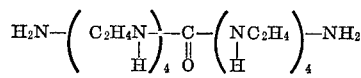

For the purpose of further discussion of this invention and also in the claims the class of polyamino urea will be defined as "reaction product of two moles of polyalkylene amine with one mole urea."

Succinimides

The aforementioned particular use of the polyamino ureas in the formation of succinimides is now described. The succinimides are prepared through reaction with a mono-alkenyl substituted succinic anhydride having as its alkenyl substituent a hydrocarbon group derived from polyolefin of 30 or more carbon atoms especially polypropylenes and polybutenes of 30 or more carbon atoms. The useful polypropylenes and polybutenes and hence the alkenyl substituent have a carbon content in the range of 30 to 200 carbons. The alkenyl substituent of the monoalkenyl succinic anhydride has a molecular weight in the range of from 400 to 100,000. The preparation of such monoalkenylsuccinic anhydrides by reacting maleic anhydride and a polypropylene or polybutene of said 400 to 100,000 molecular weight range is known.

The alkenylsuccinimide derivatives of the polyamino ureas of this invention are obtained by reacting for each mole of monoalkenyl substituted succinic anhydride 0.4 to 0.7 mole of polyamino urea at 200 to 450° F., preferably 300 to 400° F. and aid in removing by-product water by the use of an inert gas, e.g. nitrogen purge or by passing the inert gas through the reaction mixture. This reaction between monoalkenylsuccinic anhydride and polyamino urea is advantageously carried out in an inert diluent such as xylene or preferably a light hydrocarbon lubricating oil such as solvent extracted SAE 5W oil or white mineral oil or mixtures of these hydrocarbon oils with polybutene or polypropylenes of the 500 to 100,000 moleculer weight range. It is desirable to conduct said succinimide reaction with proportions of reactants which will provide the succinimide product in concentrations of from 40 to 60 weight percent when a light hydrocarbon diluent is used for such compositions are excellent concentrates for blending with lubricant base oils and other lubricant additives such as anti-rust, anti-wear, anti-corrosion, etc. agents. The succinimide product can be borated with boric acid, a boric acid ester, boric anhydride, etc. in the manner disclosed for borating similar acylated amines in U.S. Patent 3,000,916 issued Sept. 19, 1961, to Klass et al. The boration for example is conducted at 120 to 400° F. using from 0.2 to 2 or more moles of boric acid per mole of alkenylsuccinic anhydride. Although up to as high as about 1.5 gram atoms of boron per gram atom of nitrogen in the succinmide can be reacted, to retain high detergency and dispersancy provided by the amino groups and yet obtain the advantages of boration of acylated amines taught by Klass et al. it is desirable to have a boron to nitrogen (B/N) weight ratio in the finished product in the range of 0.05 to 1.0, preferably the B/N weight ratio is in the range of 0.10 to 0.5 inclusive.

The boration of other acylated amines such as poly primary amines acylated with dimer acids and polymer acids and ethylene amines and alkylene amines acylated with $C_{30}$ and higher alkenyl substituted succinic acids and anhydrides appears to be desirable for the purposes of providing higher anti-rust, anti-wear, etc. properties of formulated compositions. The borating appears to be desirable to reduce the tendency of the plurality of amino groups of those acylated amines from being too efficient and preventing metal protectors from forming desirable protective films on the metal surfaces. However, the succinimides of the polyamino ureas of this invention do not appear to require boration for the same reasons. In fact, exceptionally long-lasting lubricating formulations can be prepared from the unborated succinimides of the polyamino ureas of this invention as will hereinafter be exemplified. Also the succinimides of this invention need not have as high a carbon content in the alkenyl substituent on the succinic acid or anhydride moiety to have excellent oil solubility as do the alkenyl substituted succinic acid or anhydride derivatives (amides or imides) heretofore proposed as lubricant detergent and/or dispersant additives.

The following example illustrates the preparation of the alkenyl succinic anhydride derivative of the polyamino urea of this invention.

EXAMPLE 1

To a 3000 gallon kettle vented through a stack to the atmosphere there is charged 1254 gallons (9600 pounds) of a solution of polybutenyl substituted succinic anhydride having a molecular weight of about 960. This solution contains 54 weight percent of the substituted succinic anhydride dissolved in a mixture of 860 molecular weight polybutene and solvent extracted SAE 5W oil. Thus 5.4 moles of the polybutenyl succinic anhydride are charged. Also charged to the kettle are 339 gallons of additional solvent extracted SAE 5W oil. The resulting mixture is heated to 250–260° F. while blanketed with an inert gas such as nitrogen. Thereafter 122 gallons (1095 pounds or 2.7 pound moles) of a polyamino urea obtained by reacting two moles tetraethylene pentamine with one of urea is pumped in over 60 minutes. This di(pentamino) urea has a nitrogen content of about 30.5, a total base number (MgKOH/gram) of about 815, a SSU viscosity at 210° F. of about 72, a gravity of about 9.0 and a 365° F. flash point. The reaction mixture is heated to 300° F. and held at this temperature for about 2 hours while sparging nitrogen through the reaction mixture to aid in the removal of by-product water, about 97 pounds. The resulting reaction mixture contains about 49 weight percent di(polybutenylsuccinimide) of the di(pentamino) urea. Filtration of the reaction mixture generally provides a brighter (clearer) product.

When tetraethylene pentamine is reacted with $C_{30}$ and higher alkenyl substituted succinic acids and/or anhydride lower temperatures of combining these reactants are employed as well as lower initial reaction temperatures and slower rates of addition than are used in Example 1. The lower addition and reaction temperatures and slower addition rates are necessary to prevent excessive losses of tetraethylene pentamine.

Boration of the succinimides of polyamino ureas of this invention is illustrated in Example 2.

EXAMPLE 2

Before filtering the product of Example 1 and while the product is at 300° F., 600 pounds of boric acid slurried in 150 gallons of solvent extracted SAE 5W oil are added as rapidly as possible without causing excessive foaming. Thirty minutes is a suitable addition time for the slurry of boric acid in the SAE 5W oil. The slurry charge line is washed with an additional 100 gallons of SAE 5W oil first used to wash the vessel in which the slurry of boric acid was prepared. The resulting mixture is held at 300° F. for one hour, nitrogen is then sparged into and through the reaction mixture for 2 hours at 300° F. Thereafter the product is filtered using a filtering aid and cooled to ambient temperature. The product contains about 40 weight percent of the borated disuccinimide of di(pentamino urea), has a nitrogen content of 2.07 weight percent, a boron content of 0.58 weight percent, a B/N weight ratio of 0.28 to 1.0, a gravity of 7.68 pounds per gallon, a SSU viscosity at 210° F. of 900 and a flash point of 380° F.

EXAMPLE 3

The process of Example 1 is repeated using 5.4 pound moles of polybutenyl succinic anhydride having a molecular weight of about 3100, 2.7 pound moles of the dipentamino urea and 11825 pounds of SAE 5W oil as reaction diluent. The resulting filtered product was a clear, light colored solution containing about 60 percent by weight of the disuccinimide of the dipentamino urea.

EXAMPLE 4

There are combined 2.7 pound moles of the dipentamino urea described in Example 1 and 5.4 pound moles of a polybutenyl succinic anhydride having a molecular weight of about 3100 as a 50 weight percent solution is about equal parts by weight of SAE 5W oil and 3000 molecular weight polybutene. After about 97 pounds of by-product water had been removed at 300° C. and sparging with inert gas, e.g. nitrogen, the reaction mixture is diluted further with SAE 5W oil, about 1000 pounds, to provide a 50 weight percent solution of the disuccinimide of the dipentamino urea.

EXAMPLE 5

The process of Example 4 is repeated except that after removal of by-product water a slurry of 600 pounds boric acid in SAE 5W oil at 200° F. is added and the mixture is heated at 300° F. for 90 minutes with nitrogen sparging. The resulting mixture is diluted with SAE 5W oil to a finished product solution of about 40 weight percent borated product and then filtered.

EXAMPLE 6

A 50 weight percent solution (solvent: 50% 1650 MW polypropylene and 50% SAE 5W oil) polypropenylsuccinic anhydride having a molecular weight of about 1750 is charged at 250° F. to a heat jacketed kettle to provide 6.0 pound moles of the succinic anhydride, 21,000 pounds of solution. Then there is added 735.5 gallons of the dipentamino urea (3.0 pound moles) described in Example 1 and this mixture is heated to 325° F. with nitrogen sparging until all the by-product water is removed. A slurry of 670 pounds boric acid in SAE 5W oil at 200° F. is added. Then the entire mixture is held at 300° F. for 90 minutes while sparged with nitrogen. This product is filtered using a diatomaceous earth filter aid and diluted with SAE 10 oil to a solution containing 45 weight percent of the borated product.

The effect of boration on the detergent-dispersant properties of the dialkenylsuccinimides of the polyamino ureas of this invention and the similar effect on detergent-dispersant properties of dialkenylsuccinimide of alkylene amines having 2 to 10 nitrogens can be shown by a comparison of results from a useful detergency candidate Spot Detergency Test. In this test oil formulations already tested under control tests at various levels of dispersancy in a standard engine detergency-dispersancy test are employed as source of "in engine" produced sludge. A composite of these used formulations is made and thoroughly mixed. A weighed amount of used oil composite and a weighed amount of the detergency candidate are combined and heated to 300° F. Thereafter this mixture is added to an equal volume of fresh unused, unformulated SAE 20 oil also at 300° F. The resultant mixture is held at 300° F. for two hours. Thereafter, while thoroughly stirring the hot mixture of fresh oil, used oil and detergency candidate, duplicate three drop (from capillary pipette) portions are placed on blotting paper. The blotting paper so treated is permitted to stand for 12 to 16 hours. There are two concentric circles where each three drop deposit is made. The inner circle is black and the outer annulus is somewhat clear. For each of the duplicate spot test the diameter measurements are made by measuring the spot diameter twice: two directions at right angles to each other. The outer circle diameters are taken in the same way. Thus for each set of duplicate spot tests, four diameter ratios are obtained. The average of the four ratios of diameter of spot to diameter of large oil ring multiplied by 100 is called SDT number. The SDT number relates semi-quantitatively to degree of sludge dispersancy of the candidate tested. This does not mean that SDT number data can be used to predict the total sludge value rating which will be obtained in a Lincoln Sequence V engine test but when used with a control spot test (no fresh detergent) and compared with known high detergency additives tested at the same time the relative order of the SDT numbers are indicative of performance to be expected from actual Lincoln Sequence V tests. SDT number values of 60 to 80 for detergency candidates are indicative of likely success in attaining a passing minimum 35 total sludge value rating and not that a particular total sludge value rating will be achieved for any particular SDT number value in the 60 to 80 range.

First with respect to effect of boration on detergent-dispersant properties. All detergent-dispersants were used at the same concentration of 2.0% by weight with portions of the same used oil. All borated products had the same B/N weight ratio. Detergent-dispersant A is the unborated $N_1,N_5$-disuccinimide of tetraethylene pentamine (TEPA) wherein the succinimide substituent is from polybutenylsuccinic anhydride (PBSA) having a molecular weight of about 1000. Detergent-dispersant B is the boric acid borated derivative of detergent-dispersant A. Detergent-dispersants A and B are given for purpose of comparison and they per se are not a part of this invention. The other detergent-dispersants are those of this invention and are also disuccinimides.

sulfonate and has a total base number of 300. The magnesium salt of a petroleum hydrocarbon derived hydrocarbon sulfonic acid which solution contains 40 weight percent of the calcium sulfonate and has a total base number of 300. The zinc dialkyl dithiophosphate additive is also a solution of the zinc salt in SAE 5W oil containing 57.9 percent by weight of the zinc salt whose alkyl groups are isopropyl and oxo-decyl in the mole ration of 65 mole percent isopropyl and 35 mole percent oxo-decyl. The disuccinimide of polyamino urea used as dispersant-detergent is a solution thereof in a liquid polybutene-SAE 5W oil mixed solvent containing 40 weight percent of the disuccinimide as the borated or non-borated derivative. The solution of disuccinimide has a nitrogen content of 2 weight percent and the boron content is indicated by the boron to nitrogen weight ratio (B/N) wherein a specific number above zero not only indicates the presence of boron but also said B/N weight ratio and a B/N value of zero indicates the unborated disuccinimide. The disuccinimide (B/N=0) is that of Example 1. In the formulations all "percent" are volume percent.

Formulation A

Ingredient: Volume percent
SAE 20 base oil _____ 94.18
Zinc dialkyl dithiophosphate additive _____ 1.0
Disuccinimide additive (B/N of 0.15) _____ 4.82

Formulation B

Ingredient: Volume percent
SAE 20 base oil _____ 96.59
Zinc dialkyl dithiophosphate additive _____ 1.0
Disuccinimide additive (B/N of 0) _____ 2.41

Formulation C

Ingredient: Volume percent
SAE 20 base oil _____ 95.6
Zinc dialkyl dithiophosphate additive [1] _____ 1.0
Disuccinimide additive (B/N of 0.35) _____ 2.4

[1] Alkyl groups are a mixture of $C_8$, $C_5$ and $C_3$ alkyl groups.

Formulation D

Ingredient: Volume percent
SAE 20 base oil _____ 94.4
Zinc dialkyl dithiophosphate additive _____ 1.0
Disuccinimide additive (B/N of 0.35) _____ 3.6
Magnesium sulfonate additive _____ 1.0

Formulation E

Ingredient: Volume percent
SAE 20 base oil _____ 95.58
Zinc dialkyl dithiophosphate additive [1] _____ 0.82
Disuccinimide additive (B/N of 0.0) _____ 3.60
Magnesium sulfonate additive _____ 1.0

[1] Alkyl groups are a mixture of $C_8$, $C_5$ and $C_3$ alkyl groups.

TABLE I.—EFFECT OF BORATION ON DETERGENT-DISPERSANT PROPERTIES OF DISUCCINIMIDES

| Detergent-Dispersant | Disuccinimide Reactants | | Borated | | SDT Number | SDT Number Reduction From Boration |
| --- | --- | --- | --- | --- | --- | --- |
| | Polyamine | Alkenyl Succinic Anhydride | No | Yes | | |
| A | TEPA | 1,000 MW PBSA | ✓ | | 67.2 | } 6.4 A to B. |
| B | TEPA | 1,000 MW PBSA | | ✓ | 60.8 | |
| Example 7 | Dipentamino urea | 1,000 MW PBSA | ✓ | | 74.8 | } 12.4 Examples 7 to 8. |
| Example 8 | do | 1,000 MW PBSA | | ✓ | 62.4 | |
| Example 9 | do | 3,000 MW PBSA | ✓ | | 77.7 | } 13.8 Examples 9 to 10. |
| Example 10 | do | 3,000 MW PBSA | | ✓ | 63.9 | |

The following lubricant oil formulations are prepared for use in standardized engine test procedures known as Lincoln Sequence V engine test, Ford–289 cubic inch displacement engine with positive crankcase vent (PCV) valve in crankcase vent line to intake manifold, an L–38 oxidation stability engine test and a diesel engine performance test in the Caterpillar 1–H diesel engine.

The following lubricant oil formulations are prepared by combining with the base oil the indicated additives as solutions. More specifically the calcium sulfonate additive is a solution in SAE 5W oil of the calcium salt of the sulfonic acid derivative of a petroleum derived hydrocarbon which solution contains 40 weight percent of the calcium Formulation F Ingredient: Volume percent
SAE 20 base oil _____ 96.79
Zinc dialkyl dithiophosphate additive _____ 1.0
Magnesium sulfonate additive _____ 1.0
Disuccinimide additive (B/N 0.27) _____ 1.2

Formulation G

Ingredient: Volume percent
SAE 20 base oil _____ 93.0
Zinc dialkyl dithiophosphate additive [1] _____ 1.0

Calcium sulfonate additive _____ 1.0
Disuccinimide additive (B/N 0.5) _____ 5.0

[1] Alkyl groups are a mixture of $C_3$, $C_5$ and $C_8$ alkyl groups.

Formulation H

Ingredient: Volume percent
SAE 20 base oil _____ 96.6
Zinc dialkyl dithiophosphate additive _____ 1.0
Disuccinimide additive (B/N of 0) _____ 2.4

Formulation I

Ingredient: Volume percent
SAE 20 base oil _____ 96.6
Zinc dialkyl dithiophosphate additive _____ 1.0
Disuccinimide additive (B/N of 0.3) _____ 2.4

Formulation J

Ingredient: Volume percent
SAE 20 base oil _____ 96.6
Zinc dialyl dithiophosphate additive _____ 1.0
Disuccinimide additive (B/N of 0.4) _____ 2.4

Formulation K

Ingredient: Volume percent
SAE 20 base oil _____ 94.6
Zinc dialkyl dithiophosphate additive _____ 1.0
Calcium sulfonate additive _____ 2.0
Disuccinimide additive (B/N of 0.27) _____ 2.4

The foregoing formulations were subjected to four engine performance tests according to the following tabulated test schedule:

| Lincoln MS Sequence V | Ford 289 Cubic Inch | CLR L-38 | Caterpillar Diesel 1-H |
|---|---|---|---|
| Formulation A | Formulation G | Formulation H | Formulation K |
| Formulation B | | Formulation I | |
| Formulation C | | Formulation J | |
| Formulation D | | | |
| Formulation E | | | |
| Formulation F | | | |

LINCOLN MS TEST SEQUENCE V

Briefly, this test designed to evaluate dispersancy characteristics of formulated lubricant oils consists of using the oil to be tested as a lubricating oil in a V-8 Lincoln engine under prescribed test conditions. Accordingly, five quarts of oil are placed in the crankcase and the engine is started and run in accordance with the four-hour cycle:

| | Phase 1 | Phase 2 | Phase 3 |
|---|---|---|---|
| Duration | 45 min | 2 hr | 75 min. |
| Speed, r.p.m | 500 | 2,500 | 2,500. |
| Load, lbs | No load | (105 HP) | (105 HP). |
| Temperature, °F.: | | | |
| Water out | 115-120 | 125-130 | 170-175. |
| Oil Sump | 120-125 | 175-180 | 205-210. |
| A/F | 9.5±0.5 | 15.5±0.5 | 15.5±0.5. |

The four-hour cycle is reset a total of 48 times (192 hours running time). After each 16 hours of operation the engine is shut down for 8 hours. Two-ounce samples of oil are taken every 30 hours and the oil level is adjusted with fresh oil to a level of five quarts. Added oil is weighed. At the time of the test, the hot oil is drained, weighed and recorded. The engine is then disassembled and tested for deposits of varnish and sludge among other observable results as set out in the table below. Engine components are examined visually and rated on a scale of 1 to 10, 10 being a perfect reading indicating no sludge or varnish. A rating of 50 for total sludge and for total varnish is considered perfect; a rating of 10 for piston varnish is considered perfect; a rating of 60 percent or lower is considered passing for screen clogging; and a rating of 50 percent or lower is considered passing for ring plugging.

The results from these tests are hereinafter presented.

The Ford 289 cubic inch displacement engine test, hereinafter designated as "F-289 test," is conducted in the same manner as the Lincoln MS Test Sequence V except for the apparent difference in test engines. This F-289 test is more severe with respect to both sludge and varnish formation and deposition. Also the F-289 test is conducted with vapors from the crankcase being introduced into the engine fuel intake system by means of a positive crankcase ventilation system which, in part, results in the more severe sludge and varnish formation during test operation.

The CLR L-38 engine test is designed to evaluate high temperature oxidation stability of the formulated lubricant oil and such evaluation is based on piston varnish deposit and copper-lead bearing corrosion. In this test a single cylinder water cooled Labees oil test engine is operated at 3150 r.p.m. for 40 hours with the test oil formulation. The oil is maintained at 300° F. and cooling water is maintained at 195° F. Copper-lead connecting rod bearings are weighed before and after the 40 hour test. Bearing weight loss (BWL) of 50 milligrams or less is desired. After the 40 hour test the piston is visually evaluated and a varnish value is assigned by comparison to varnish deposit pictorial standards having assigned values of 1 to 10 for the color and extent of varnish deposit. In this varnish value scale of 1 to 10, the value 10 represents a clean and varnish free piston and the value 1 represents a substantially complete dark varnish coated piston. To qualify as a premium oil additive the varnish value should be 9.0 and above.

The Caterpillar 1-H diesel engine test is a 480 hour test conducted with a high-speed, super charged Caterpillar diesel engine. This test is designed to measure the high temperature detergency properties of crankcase lubricating oils for qualification under Army Ordnance Specification M.1L-2104B. The performance of a candidate crankcase lubricating oil formulation is determined by inspection of piston top ring grooves for carbon deposit which is measured and percent of filling determined. The extent of varnish lacquer deposit on the piston lands and in the lower ring grooves is evaluated. To qualify, a candidate crankcase lubricating oil formulation test should result in no more than and desirably less than 30% carbon deposit in the top ring groove. The deposit of only traces of varnish and lacquer are acceptable to qualify successfully.

The engine test performance data of the foregoing formulations are shown in the following tables.

LINCOLN MS TEST SEQUENCE V

| Lubricant Formulation | Sludge | Varnish | Oil Ring Plugging |
|---|---|---|---|
| A | 47 | 40 | None |
| B | 40 | 36 | 8% |
| C | 38 | 38 | 27% |
| D | 45 | 43 | None |
| E | 42 | 40 | 0 |
| F | 31 | 36 | 36 |

In the more severe Ford 289 engine test the use of Formulation G resulted in a sludge rating of 44, a varnish rating of 37 and no oil ring plugging.

L-38 Engine Test

Formulation H:
Bearing weight loss (mg.) _____ 122
Piston varnish _____ 9.7
Formulation I:
Bearing weight loss (mg.) _____ 21
Piston varnish _____ 9.6
Formulation J:
Bearing weight loss (mg.) _____ 15
Piston varnish _____ 9.6

Caterpiller Diesel 1-H Engine Test

Formulation K:
Carbon top ring grooves (percent) _____ 10
Varnish:
Lands _____ Trace
Bottom grooves _____ None The superior detergency of the disuccinimide additive [bis-(alkylsuccinimides) of polyalkylene amines] of this invention over the bis-(alkylsuccinimide) of polyalkylene amines and thus borated derivatives can be illustrated by their use in crankcase lubricating oil formulations subjected to Lincoln MS Test Sequence V where the crankcase lubricating oil formulations contained the same base oil and the same zinc dialkyl dithiophosphate anti-corrosion anti-oxidant additive all in the same amounts. The only differences between the formulations are the amounts of detergent additive used to assure a sludge rating of at least 40. The three detergents used are all derived from a polybutenyl succinic anhydride whose polybutenyl substituent group has a molucular weight of about 860 and a commercial polyalkylene amine having a composition corresponding to tetraethylene pentamine (TEPA) used in a molar ratio of 2 moles polybutenyl succinimide per mole polyalkylene amine, and in the case of the borated product, boric acid. The detergent representative of those of this invention was derived from the same polybutenyl (MW of 860) succinic anhydride and di(pentamino) urea, i.e., the detergent prepared as described in Example 1. Thus these detergents are:

Detergent 1: Bis(polybutenyl succinimide) of TEPA
Detergent 2: Borated bis(polybutenylsuccinimide) of TEPA $B/N=0.3$
Detergent 3: Bis(polybutenylsuccinimide) of dipentamine urea

DETERGENT AMOUNT FOR 45 SLUDGE
IN LINCOLN MS TEST SEQUENCE V

Detergent 1: 2.0 weight percent, 40 sludge rating
Detergent 2: 2.0 weight percent, 43 sludge rating
Detergent 3: 1.0 weight percent, 40 sludge rating From the foregoing it is apparent that the detergent additives derived from polyamino ureas of this invention are substantially more effective lubricant oil detergent-dispersant agents than those of the prior art such as are disclosed in U.S. Patent 3,087,936 of which detergent 1 and detergent 2 illustrate.

The alkenylsuccinimide derivatives of the polyamino ureas and their borated derivatives of this invention are useful blending agents for lubricant oil formulations when dissolved in hydrocarbon of the lubricant oil class, i.e., viscosity range of lubricant base blending oils, in the range of about 10% up to 50% by weight. Such concentrates are readily blended with oil solutions of other additive ingredients and with base oils to prepare fully formulated lubricant oils ready for packaging. For example, by flow or pump proportioning an oil solution of 83 weight percent dialkyl dithiophosphate (9.2% Zn, 8% P and 16% S), an oil solution (49 weight percent of alkenylsuccinimide of tetraethylene pentamine-urea polyamino urea (Example 1), an oil solution of 40 weight percent manganese salt of alkyl-substituted aryl sulfonic acid (total base number of 400), an oil solution of viscosity index improver, SAE-5 base oil and SAE-20 base oil are blended in a common transfer line feeding a centrifugal pump which in turn supplies a packaging machine for filling and sealing one-quart cans. Such a blending technique can be used to package formulations of the type hereinbefore disclosed and subjected to engine testing. For finished formulated lubricating oils the concentration of the borated or unborated alkenylsuccinimides of the polyamino ureas in lubricant oils can be varied in the range of 0.1 to 10 weight percent. Such compositions can be prepared by the aforementioned in line blending or by diluting the concentrates illustrated in Examples 1 through 6 with lubricant oils, e.g., SAE 10, SAE 20, SAE 30, SAE 40, SAE 50 and the like weights and mixtures thereof.

As hereinbefore indicated the detergent-dispersants of this invention can be used alone or with other lubricating oil additives such as the zinc dialkyl dithiophosphates, the alkaline earth metal sulfonates, the alkaline earth metal succinates, the alkaline earth metal hydroxyarylalkyl amines (hydroxyphenyl methylols-diamine reaction products sometimes called Mannich condensation products), viscosity index improvers such as the near solid polybutenes and polyacrylic acid esters, synthetic polyesters and polyether lubricant oils, sulfurized animal and vegetable oils, and other lubricant oil addition agents.

What is claimed is:
1. A solution in a hydrocarbon lubricating oil containing from 0.1 to 50 weight percent of an alkenylsuccinimide derivative obtained from the reaction of:
   (a) an alkenyl hydrocarbon substituted succinic anhydride having in its alkenyl substituent from 30 to 200 carbon atoms and
   (b) a polyamino urea derived from reacting at a temperature in the range of 200° to 500° F. urea and a polyalkylene polyamine of the formula

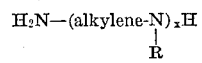

in which the alkylene contains from 1 to 8 carbon atoms, R is hydrogen or a lower alkyl group of from 1 to 4 carbon atoms and $x$ is an integer of from 2 to about 10, at a mole ratio of two moles polyalkylene polyamine per mole of urea with the evolution of two moles ammonia per mole urea, conducted at a temperature in the range of 200° to 450° F. with 0.4 to 0.7 mole of polyamino urea per mole alkenyl hydrocarbon substituted succinic anhydride and with the removal of by-product water.

2. The solution of claim 1 wherein the alkenylsuccinimide derivative is in the form of its boric acid borated product having a boron to nitrogen weight ratio in the range of 0.05 to 1.0 to 1.0 to 1.0.

3. The solution of claim 1 wherein there is 10 to 50 percent by weight of the alkenylsuccinimide of the polyamino urea (b) derived from two moles tetraethylene pentamine and one mole urea.

4. The solution of claim 1 in which the lubricating oil is a crankcase lubricating oil having dissolved therein as its essential detergent-dispersion 0.1 to 10 weight percent of the alkenylsuccinimide of the polyamino urea (b) derived from two moles tetraethylene pentamine and one mole urea.

5. The solution of claim 4 wherein the alkenylsuccinimide derivative is in the form of its boric acid borated product having a boron to nitrogen weight ratio of 0.1 to 1.0 to 0.5 to 1.0.

References Cited

UNITED STATES PATENTS

| | | | |
|---|---|---|---|
| 3,087,936 | 4/1963 | Le Suer | 252—49.6 X |
| 3,219,666 | 11/1965 | Norman et al. | 252—51.5 X |
| 3,281,428 | 10/1966 | Le Suer | 252—49.6 X |
| 3,322,670 | 5/1967 | Burt et al. | 252—49.6 X |

DANIEL E. WYMAN, Primary Examiner

W. CANNON, Assistant Examiner

U.S. Cl. X.R.

252—51.5